US008820516B2

(12) United States Patent
Christ

(10) Patent No.: US 8,820,516 B2
(45) Date of Patent: Sep. 2, 2014

(54) DEVICE FOR LOADING AND UNLOADING A FREEZE DRYING SYSTEM

(75) Inventor: Martin Christ, Osterode (DE)

(73) Assignee: Martin Christ Gefriertrocknungsanlagen GmbH (DE)

( * ) Notice: Subject to any disclaimer, the term of this patent is extended or adjusted under 35 U.S.C. 154(b) by 145 days.

(21) Appl. No.: 13/260,319

(22) PCT Filed: Oct. 11, 2010

(86) PCT No.: PCT/EP2010/006180

§ 371 (c)(1),
(2), (4) Date: Sep. 25, 2011

(87) PCT Pub. No.: WO2011/045008

PCT Pub. Date: Apr. 21, 2011

(65) Prior Publication Data

US 2012/0186947 A1 Jul. 26, 2012

(30) Foreign Application Priority Data

Oct. 12, 2009 (DE) ......................... 10 2009 049 142

(51) Int. Cl.

| | |
|---|---|
| ***B65G 25/08*** | (2006.01) |
| ***B65G 47/66*** | (2006.01) |
| ***F26B 25/00*** | (2006.01) |
| ***F26B 5/06*** | (2006.01) |

(52) U.S. Cl.

CPC ................. *F26B 5/06* (2013.01); *F26B 25/001* (2013.01)

USPC .......................................... 198/747; 414/180

(58) Field of Classification Search

None

See application file for complete search history.

(56) References Cited

U.S. PATENT DOCUMENTS

| | | | | |
|---|---|---|---|---|
| 4,017,001 | A | 4/1977 | Barthalon et al. | |
| 5,069,440 | A * | 12/1991 | Lazzarotti et al. | 271/202 |
| 5,261,774 | A | 11/1993 | Le Floc'h et al. | |
| 7,210,889 | B2 * | 5/2007 | McFarland | 414/331.02 |
| 7,343,696 | B2 | 3/2008 | Covert | |
| 7,695,230 | B2 * | 4/2010 | Selch | 414/180 |
| 7,762,383 | B2 | 7/2010 | Damen | |

FOREIGN PATENT DOCUMENTS

| | | | |
|---|---|---|---|
| DE | 2930534 | A * | 2/1981 |
| DE | 10307571 | A1 | 9/2004 |
| DE | 602004003692 | T2 | 10/2007 |
| DE | 102007046172 | A1 | 4/2009 |
| WO | 2005121671 | A1 | 12/2005 |

* cited by examiner

*Primary Examiner* — Kavel Singh

(74) *Attorney, Agent, or Firm* — Fox Rothschild LLP

(57) ABSTRACT

A device for loading and unloading the standing surface of the drying chamber of a freeze drying installation. The device includes a carriage disposed above an unloading position of the surface which extends transversely to a movement direction during a loading or unloading process and in parallel with the standing surface and forms a movable guiding edge for the drying vessels. Guides disposed on both sides of the standing surface extend in parallel with the movement direction and form fixed guiding edges for the drying vessels. The carriage is driven by two linear motors, the respective primary parts of which are fixedly connected to both side ends of the carriage and are supported on the guides which at the same time receive the secondary parts. All of the components of the devices thus defined are located within the drying chamber, wherein a mechanically extremely simple and low-wear construction is achieved.

14 Claims, 15 Drawing Sheets

DEVICE FOR LOADING AND UNLOADING A FREEZE DRYING SYSTEM

CROSS REFERENCE TO RELATED APPLICATIONS

This application is the U.S. National Phase application of PCT International Application No. PCT/EP2010/006180, filed Oct. 11, 2010, which claims priority to German Patent Application No. 10 2009 049 142.2, filed Oct. 12, 2009.

FIELD OF THE INVENTION

The invention relates to loading and/or unloading devices for a freeze drying installation for pushing drying vessels, which contain a material to be dried and stand on one of the plurality of standing surfaces of the drying chamber of the freeze drying installation, in a movement direction for the purpose of unloading or loading the standing surface through at least one opening in the wall of the drying chamber, having a carriage which forms a guiding edge, moveable in the movement direction, and is intended to exert an advancing effect on the drying vessels, which carriage is displaceably supported on guides which are disposed inside the drying chamber on both sides at a distance from the standing surface to be loaded or unloaded, which are in parallel with each other and with the movement direction and which form fixed guiding edges.

BACKGROUND OF THE INVENTION

The freeze drying process is used in the case of thermally sensitive goods such as e.g. pharmaceutical and biochemical products, foodstuffs etc, wherein the material to be dried is first frozen, ice which has crystallized out is sublimated out of the material under vacuum and reprecipitated as ice on condensers. For this purpose, the pressure, the temperature and further parameters of the drying process are controlled and monitored according to a product-specific sublimation pressure curve in order to achieve reproducible drying results. The energy required for the sublimation is generally supplied by heating.

Freeze drying installations are in many cases arranged for batch operation and consist predominantly of a drying chamber and a condenser chamber connected thereto via a closable opening, wherein the material to be dried is contained in a number of drying vessels, flasks, ampoules or even dishes, which are placed onto a standing surface within a drying chamber in order for drying to be carried out. A number of such standing surface are disposed one above the other in the drying chamber in a frame so that they can be displaced vertically in a spaced-apart manner. Since, during a drying process and depending on the size of the freeze drying installation, a large number of drying vessels each containing a certain quantity of material to be dried have to be inserted into the drying chamber and then removed after the drying process is completed, it is usual to use devices which operate in an automated manner for the loading and also for the unloading of the drying vessels, wherein even when ordering an installation it is currently necessary to establish whether loading and/or unloading will be carried out by hand or by means of appropriate devices operating in an automated manner. Retrofitting of a freeze drying installation which is to be loaded and/or unloaded manually to allow an integrated automated process is currently not possible or is possible only with considerable outlay.

Considering the temperature sensitivity of the material to be dried, but especially owing to the necessity of providing conditions which are aseptically problem-free for all installation components which come into contact with the material to be dried, particular attention must be given in the design of a loading and unloading device as to how the configuration and manner of operation thereof are achieved in terms of achieving asepsis.

From the document DE 103 07 571 A1 a loading and unloading device for a freeze drying installation is known, wherein on the outside in front of the loading and unloading opening of a drying chamber, a horizontally movable slide intended for loading purposes and a carriage, which is intended for unloading purposes and is similarly moveable horizontally into the chamber, are provided. The slide cooperates with a conveyor belt operated in a clocked manner, on which stand the drying vessels which are to be inserted into the chamber, and is characterized, amongst other things, by a strip which extends transversely with respect to the advancing direction of the loading process, which is intended to lie against the drying vessels and which can be driven on both lateral ends via a respective toothed rod drive. The carriage is formed by a frame which can be driven into the chamber separately by the slide via the unloading opening as far as the rear end opposite thereto, and in this case travels over the standing plate including the drying vessels standing thereon, wherein on both sides of the carriage a respective linkage system which can be wound up and which is suitable for transferring pulling and pushing forces is provided and is connected to a drive outside the chamber. The said frame which travels over the drying vessels is supported via rollers on the standing surface which is to be unloaded and which has lateral partitions. By means of a transversely extending structure which can be lowered automatically by the frame upon reaching a contact position at the said rear end, an entrainment effect on the drying vessels standing on the standing surface is produced so that the unloading process is initiated by actuation of the two linkage systems.

Almost all the components of this known loading and unloading device, including the said drives, are located outside the drying chamber so that there is a not inconsiderable requirement for space in front of the drying chamber. Separate systems for both loading and unloading are provided which are formed in mechanically entirely different ways and which are each of a relatively complicated construction and are therefore formed such that in association therewith they are prone to collecting dirt so that they are consequently troublesome to clean. In particular, the achievement of a condition which is sufficiently aseptic for use in, and in front of, a freeze drying installation is in any case rendered more difficult. The results of this are also found, amongst other places, in the said linkage systems which, in the same manner as the carriage, are guided in a plane above the standing surface to be unloaded, so that at this location abrasion is unavoidably produced which falls onto the standing surface. The results of this are also found in the mechanical system which effects the automatic lowering of the structure intended to exert an entrainment effect on the drying vessels standing on the standing surface. The fact that the standing surfaces used are provided with lateral partitions is also to be regarded as disadvantageous in terms of asepsis if it is considered that the carriage is supported via rollers which lie in the edge region of the standing surface and also unavoidably produce abrasion.

A comparable loading and unloading device for a freeze drying installation is known from the document WO 2005/121671. For the purpose of loading the standing plate, which is located in a loading position in front of a slit, intended for loading and unloading purposes, in the housing wall of the drying chamber, a slide is provided in that case and can move through the slot into and out of the drying chamber. Unloading is achieved by a conveyor strip which can travel along lateral guides extending in parallel with the edges of the standing plate, which conveyor strip can additionally pivot about its longitudinal axis and specifically between an insertion position intended for travel over the drying vessels standing on the standing plate, and an exit position to push the drying vessels out. The conveyor strip is driven during insertion into the drying chamber, during exit out of the drying chamber and also during pivoting about its longitudinal axis between the said positions by virtue of a traction means connected to the ends of the conveyor strip, with the cooperation of drives disposed outside the drying chamber and connected to the ends of the conveyor strip. The difficulties already described above concerning the achievement and maintenance of aseptic conditions arise to the same degree in this case. The slide also requires a not inconsiderable amount of space in front of the said slot.

Another loading and unloading device for a freeze drying installation is known from the document DE 60 2004 003 692 T2, which is characterized by guides extending into a chamber on both sides of a set-down surface, on each of which guides a carriage is disposed, wherein the two carriages are connected by a rod which is disposed, with pivot levers interposed, so as to be pivotable about an axis extending perpendicular to the guides between a lower position fulfilling a stop function while the vessels standing on the set-down surface are being pushed in, and an upper position permitting travel over the vessels and fulfilling an ejection function. The rod connecting the carriages is supported in its lower position via wheels which roll on the set-down surface. In front of an inlet opening outside the chamber is located a bar-like pusher mechanism which is arranged to push the vessels into the chamber. Belt drives are used to drive the carriages including the pivot mechanism of the said rod. Difficulties associated with the production of aseptic conditions also arise in the case of this device owing to the way the said rod is supported and the constructional formation and arrangement of the assemblies moveably disposed inside the chamber. In addition to unavoidable abrasion, there is the risk of the ingress of dirt from the environment, and there are the structurally complicated conditions also found with this loading and unloading device, which make cleaning difficult.

SUMMARY OF THE INVENTION

It is the object of the invention to create a device of the type presented in the introduction in such a way that, in addition to a mechanically simple construction which can also be retrofitted without considerable outlay to chambers prepared in accordance with the invention, in particular aspects of asepsis are considered so that maintenance and cleaning work can be carried out easily. This object is achieved with such a device including at least one linear motor is provided which imparts a non-positive connection to at least one of the guides, the primary part of which linear motor, supported on the guide, is connected to the carriage and the secondary part of which linear motor is constructionally integrated into the guide.

The essential components of the device, namely a carriage and two guides which are independent of the standing surface and on which the carriage is supported, are located inside the drying chamber, wherein the guides form fixed guiding edges on both sides of a movement direction in which loading or unloading takes place, and wherein the carriage forms a moveable guiding edge extending transversely to this movement direction. The carriage is always able to travel to a corresponding side of the drying vessels for either a loading or an unloading process in order to exert an advancing effect. It is particularly advantageous that the guides both apply a guiding function to the drying vessels to be moved and also serve to support the carriage. These components which are preferably formed in an encapsulated and smooth-walled manner are easy to clean and should be accessible in particular for steam sterilization but also for other sterilization processes. The carriage is in any case connected to a drive.

The drive allocated to the carriage(s) is formed as a linear motor, a carriage being connected to at least a primary part thereof. A drive of this type is best adapted to the operating conditions of a freeze drying installation presented in the introduction since it operates in a friction-free, maintenance-free and problem-free manner even under extreme conditions and almost no abrasion is produced. Two primary parts are preferably disposed on the lateral ends of the carriage, wherein the respective secondary parts, namely a sequence of permanent magnets of alternating polarities, are constructionally integrated into the guides.

The two components, the primary part and the secondary part, can also be produced as components with entirely smooth walls on the outside, the electromagnetic functional elements of which are disposed in a hermetically encapsulated manner so that cleaning, in particular sterilization, are particularly easy to carry out.

The primary part(s) of the linear drive allocated to the carriage can be connected in terms of control technology to an external control located outside the drying chamber, in the simplest case by a group of lines which is connected to the carriage, which follows the movements thereof and is guided into the outer chamber via a vacuum-tight wall duct. In contrast, however, and also with respect to collection of dirt, in order to save on lines, multiple use of a line can be provided in the sense that this line is used at the same time for power transfer and data transfer.

Both the carriage and also the guides extend in a plane slightly above the plane in which the standing surface is located in the loading or unloading position. The carriage and the guides in each case form guiding edges which extend perpendicularly to the standing surface and form large-area, smooth contacts for the drying vessels.

The above-mentioned object is also achieved by a device wherein the drive allocated to the carriage(s) is formed as a linear motor, the primary part of which is constructionally integrated into the guide of the carriage, and the secondary part of which—formed by a series of permanent magnets—is connected to the carriage. A drive of this type is adapted to the operating conditions of a freeze drying installation in an equally effective manner as the drive described above because this alternative drive also operates in a friction-free, maintenance-free and problem-free manner under extreme conditions and almost no abrasion is produced.

Two secondary parts are preferably provided, one of which in each case is disposed on the lateral ends of the carriage, wherein the respective primary parts are accommodated in both guides.

In particular, provision can be made that the carriage forms a passive unit with the secondary part(s), which unit has no electrical or mechanical connection to the system as a whole and can be removed from the guides for cleaning purposes.

The primary part(s) of the linear drive allocated to the carriage can be connected in terms of control technology to an external control located outside the drying chamber, in the simplest case by a group of lines which is connected to the guide and is guided into the outer chamber via a vacuum-tight wall duct.

Apart from the stated differences, reference is made with respect to an alternative device including at least one linear motor is provided which imparts a non-positive connection to at least one of the guides, the primary part of which linear motor is constructionally integrated into the guide and the secondary part of which, supported on the guide, is connected to the carriage. Further alternatives of the device are described herein.

As a further embodiment of the guides, these are not a component of the standing surface located in the unloading or loading position, and the position thereof relative to each other, and therefore transverse to the said movement direction, is adjustable. Furthermore, they are either wholly displaceable in their longitudinal direction extending in parallel with the said movement direction, or the guides are each formed in a segmented manner, wherein at least individual segments are formed so as to be displaceable. The displaceability is to be understood to consist, amongst other things, of being able to produce a movement of the carriage beyond a loading or unloading opening so that, during an unloading process, the carriage affects a displacement of the drying vessels out of the drying chamber and onto an unloading table available at that location, or is able to travel, during a loading process, into a position behind the drying vessels so that an advancing function in the direction of the drying chamber can be produced. The segment formation is to be understood also to consist of the fact that outside of a loading or an unloading process, gaps are to be produced in the region of the guides so that during a drying process there are no collisions with parts of the frame receiving the standing surfaces in the drying chamber.

The guides can also be arranged for the support of two carriages. In this case an unloading and a loading process can be carried out with the proviso that by means of one carriage, which is located behind the drying vessels as seen in the respective advancing direction, an advancing function is effected, whereas a counter-holding function is effected via the other carriage. In this way the standing stability of the drying vessels in the case of short cycle times is improved.

According to further aspects of the invention, the loading and unloading device has a bridge part which is disposed outside the drying chamber, can be moved vertically and, if necessary, horizontally and forms the joining member to conveyor devices disposed downstream. This bridge part is intended to cooperate with the standing surface located in the unloading position, and the guides or segments thereof are displaceable in the longitudinal direction under the proviso that an advancing effect as far as the bridge part can be produced via the carriage.

The bridge part can be used for loading purposes.

According to another feature, a bridge part is intended for loading purposes and essentially corresponds to the bridge part intended for unloading purposes, i.e. is disposed so as to be able to travel vertically and, if necessary, horizontally and extends in a loading position in a common plane with the standing surface to be loaded, and directly adjoining this standing surface. It is significant that the guides or segments thereof can also travel in this case under the proviso that the carriage can travel in advance into such a position behind the drying vessels standing on the bridge part that an advancing function in the direction of the standing surface can be applied to these drying vessels. The guides or even the segments thereof can continue to be moved by segments disposed outside the drying chamber in order to ensure that the carriage can travel in a corresponding manner.

Other features may serve to improve the displaceability of the drying vessels, in particular on large standing surfaces which hold a large number of drying vessels. In particular, in this way it is possible to make allowance for the situation where the drying vessels are not aligned in an ordered manner one behind the other but are aligned with gaps left between them, which is otherwise associated with the risk of them becoming wedged or tipping over during displacement.

The device may further include an improvement in the precision of the positioning of a standing surface e.g. in the loading or unloading position. In general, exact positioning can be achieved only to a limited degree and only when using the said plate frame to be hydraulically activated.

A further advantage, which arises from the use of the said system of supports, in particular the achievement of a height position of a standing surface independent of the plate frame, consists of the fact that e.g. in the unloading station the vertical distance between the standing surfaces can be adapted to the height of the drying vessels. The drying vessels are closed in a known manner under vacuum by means of rubber stoppers, via which these drying vessels can adhere, after insertion of the stoppers, to the standing surfaces located above them in each case, a circumstance which at least hinders orderly extraction from the drying chamber. In accordance with the invention, on the other hand, a slight spacing between the rubbers stoppers and the standing surface located thereabove can be set, thereby allowing extraction from the drying chamber undisrupted by adhesion of the rubbers stoppers.

Further advantageous embodiments of the devices in accordance with the invention are described herein. In one embodiment, the second carriage can adopt an inoperative position or can apply a counter-holding function on drying vessels.

In general, a fixed spacing sensor can be provided which is arranged to detect the position of the moveable part, namely of the carriage.

With the aid of the embodiments above, it can be seen that the loading and/or unloading devices, which are composed of a few components which are easy to handle in terms of asepsis, are particularly suitable for gradual retrofitting to existing freeze drying installations. This is favored by the fact that the components thereof do not come into contact with the standing surfaces.

BRIEF DESCRIPTION OF THE DRAWINGS

The invention will be explained in more detail hereinunder with reference to the attached drawings in which.

DETAILED DESCRIPTION

Figure 1:
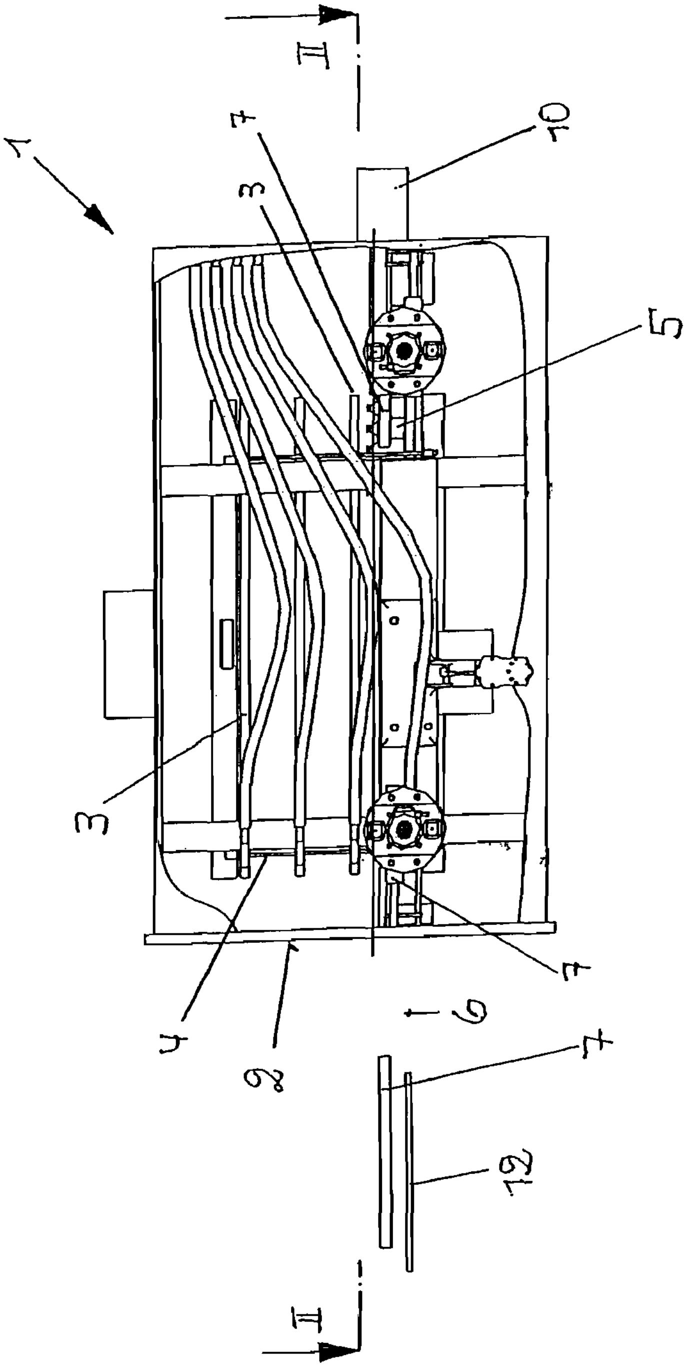
FIG. 1 illustrates a vertical cross-sectional view of a drying chamber of a freeze drying installation with an unloading device in accordance with the invention.

FIG. 1 shows a cross-sectional view of the drying chamber 1 of a freeze drying installation, located in the front side 2 of which is a closable orifice, not shown in the drawing, for loading or unloading drying vessels 5. The drying chamber 1 is connected to a condenser chamber in a manner which is known per se, however, no further detail will be given thereof at this point.

Within the drying chamber 1 is located an arrangement of standing surfaces 3 which are held in a vertically movable manner in a frame 4 in a manner known per se. These standing surfaces 3 serve for drying vessels 5, each containing a substance to be dried, to stand on, which drying vessels are to be removed from the drying chamber 1 after the drying process is concluded. The number 6 designates a height position, in this case the standing surface 3' which corresponds to the unloading position of this standing surface. It is significant that the vertical displaceability of all standing surfaces 3 of the frame 4 is arranged such that each standing surface 3 can be moved to the height position 6 corresponding to the unloading position.

Figure 2:
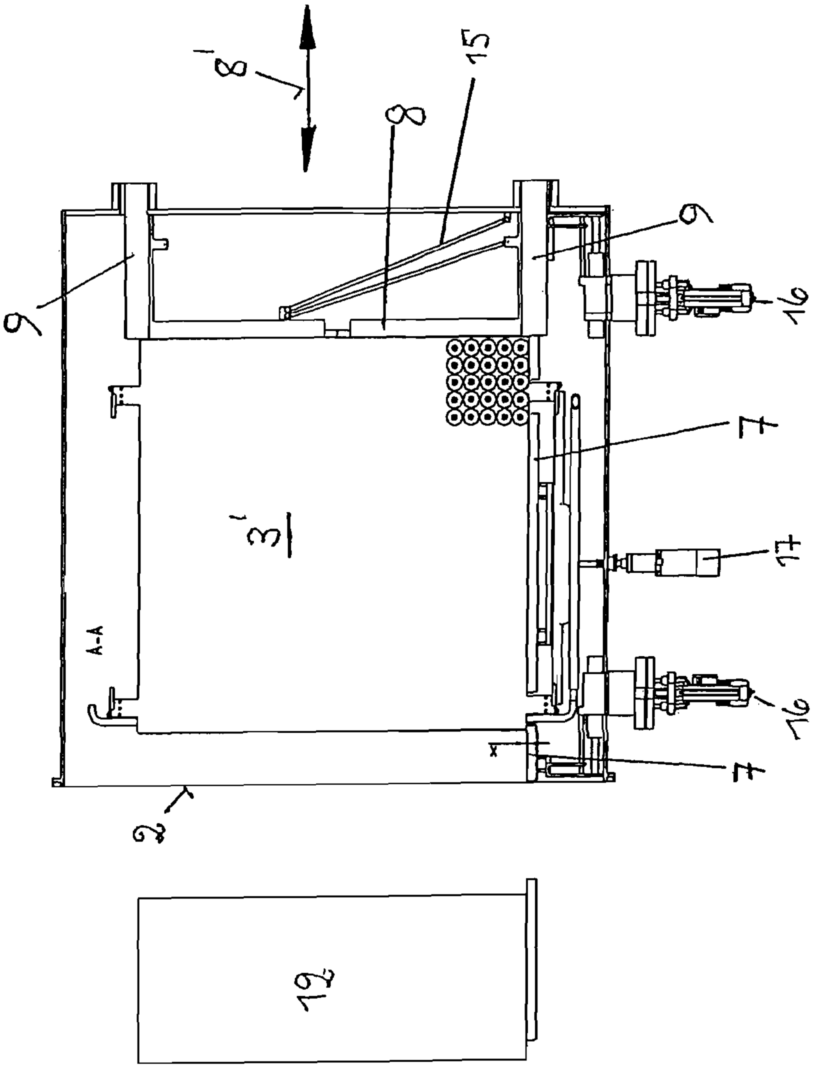
FIG. 2 illustrates a horizontal cross-sectional view corresponding to a sectional plane II-II of the drying chamber in accordance with FIG. 1.

In order to explain the structure and manner of operation of the unloading device in accordance with the invention, reference is made hereinunder initially in a supplementary manner to FIG. 2 in which functional elements which correspond to those of FIG. 1 are designated accordingly.

On both sides of the approximately rectangular standing surface 3' in accordance with the illustrated exemplified embodiment, straight strip-like guides 7 extend which are composed of a plurality of mutually spaced apart segments. These segments are disposed so as to be displaceable with respect to each other in the longitudinal direction under the proviso that they can be brought into end-face contact with respect to each other, in this case forming a continuous guide. These segments can, on the other hand, be moved into such positions, which are spaced apart from each other at the end face, that structural elements of the frame 4, which extend in the immediate proximity of lateral edge of the standing surface 3', are not hindered by these guides 7. These guides 7 are located at a height level in parallel with that of the standing surface 3' and slightly thereabove. They form lateral guiding edges for the drying vessels 5 which are to be displaced in the direction of the front side 2 during an unloading process.

The guides 7 can furthermore be displaceable in parallel with the plane of the standing surface 3' and transverse to the longitudinal direction thereof so as to achieve adaptability to different dimensions of the drying vessels 5. These should always lie against the lateral guides 7 during an unloading cycle so that the lateral spacing of the guides 7 is always arranged in terms of an even multiple e.g. of the diameter of a drying vessel 5 and the drying vessels are reliably prevented from falling over, becoming jammed or wedged. The displacement of the guides 7 in the longitudinal and transverse direction and in parallel with the standing surfaces is effected via drives 16, 17 which are disposed outside the drying chamber and are sealed inside the drying chamber in each case in the movement direction via stainless steel bellows.

The number 8 designates a carriage which extends in a strip-like manner perpendicular to the guide 7 and is shown in FIG. 2 in its rearmost position, i.e. parking position. The carriage 8 extends over the whole width of the standing surface 3' and, during an unloading process, forms a guiding edge which moves in the direction of the front side 2 and is intended for contact with the drying vessels 5 standing on the standing surface 3'. It is accordingly operatively connected to a drive to be described hereinunder. The carriage is formed in such a way that different amounts of spacing between the guides 7 can be compensated for.

This drive is formed as a linear drive and consists of two linear motors, each of which consists of an elongate primary part designated by 9 and directly supporting the carriage 8 at the side, which primary part is supported in a slidable manner on the respective guide 7 which forms a secondary part and contains in each case an arrangement of permanent magnets of polarities which alternate in the longitudinal direction. In the parking position the primary parts 9 can be partially received in pipe connections 10 in the wall of the drying chamber 1, which can otherwise be formed as windows. Corresponding to the distribution of the permanent magnets in the longitudinal direction of the guides 7, the longitudinal dimension of the segments is arranged according to the requirement to accommodate the permanent magnets which are positioned magnetically perpendicular to the movement direction 8' of the carriage 8.

The power supply of the two linear motors can be effected e.g. via a line received in a flexible vacuum-tight stainless steel corrugated hose 15, which line is connected to the two primary parts 9 via the carriage 8 and which is connected to an external control via a vacuum-tight wall duct of the drying chamber 1, which receives the said hose. Via this line or even a line group, control signals and signals describing the position of the carriage can be transmitted at the same time.

A plurality of holders which extend spaced apart from each other below the standing surface 3' in the lateral edge regions thereof and are operatively connected to the drives 16 are not shown in the drawings. By means of the drives 16 the holders are able to travel between a first position engaging below the side of the standing surface 3' facing them, and a second position in which there is no such engagement. The holders can be moved together with the guides 7. If the standing surface 3' is therefore moved slightly downwards by means of the frame 4, wherein at the same time the holders, which lie opposite each other e.g. transverse to the conveying direction 8', are located in a position in which there is engagement below one side of the standing surface 3', the respective other side of the standing surface 3', on which there is no such engagement, is further lowered together with structural elements of the frame 4 so as to result in an inclined position of the standing surface 3' of e.g. 2° to 3° which can be expedient for cleaning purposes.

With supplementary reference to FIGS. 3 to 5 in which equivalent functional elements are again designated in a corresponding manner, the manner of operation of the device will be explained hereinunder with reference to an unloading process.

The number 12 designates a bridge part which is disposed at a slight distance in front of the front side 2 of the drying chamber 1 so as to be vertically moveable in the direction of the arrows 13 and/or horizontally in the direction of the arrows 13'. The bridge part 12 cooperates with further conveyor devices, not illustrated here, for transporting away unloaded drying vessels 5 and is located in its inoperative position in FIG. 3. The carriage 8 is located in its parking position or its rearmost position with respect to the front side 2. A closable orifice provided in the front wall of the drying chamber 1 has not been illustrated in order to keep the drawing simple.

Figure 4:
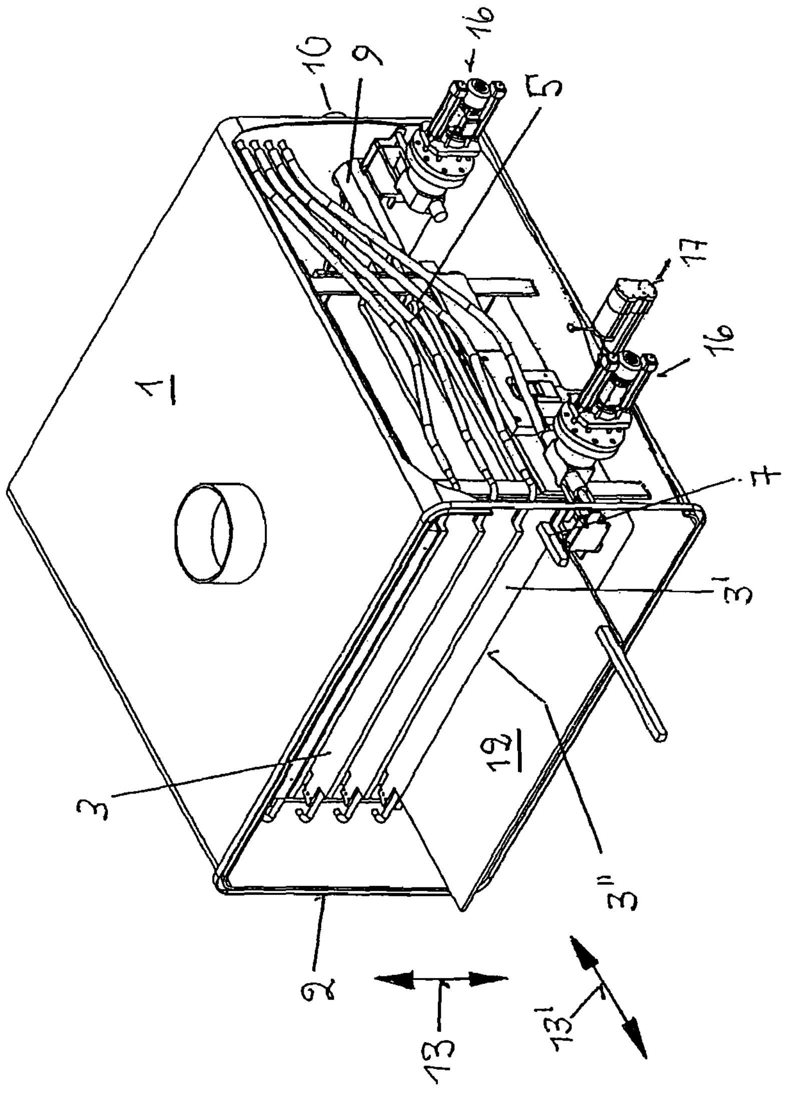
FIGS. 4, 5 respectively illustrate a perspective view of successive phases of the unloading device at the beginning of an unloading process.

In the illustration of FIG. 4 the bridge part 12 has been moved to a position in which the standing surface 3' is located in its unloading position, wherein the bridge part 12 lies directly against the facing edge 3" of the standing surface 3', which generally—namely during vertical travel of the standing surfaces 3 in the direction of the arrows 13—requires a slight horizontal displacement in the direction of the arrows 13' towards the standing surface 3'.

Figure 5:
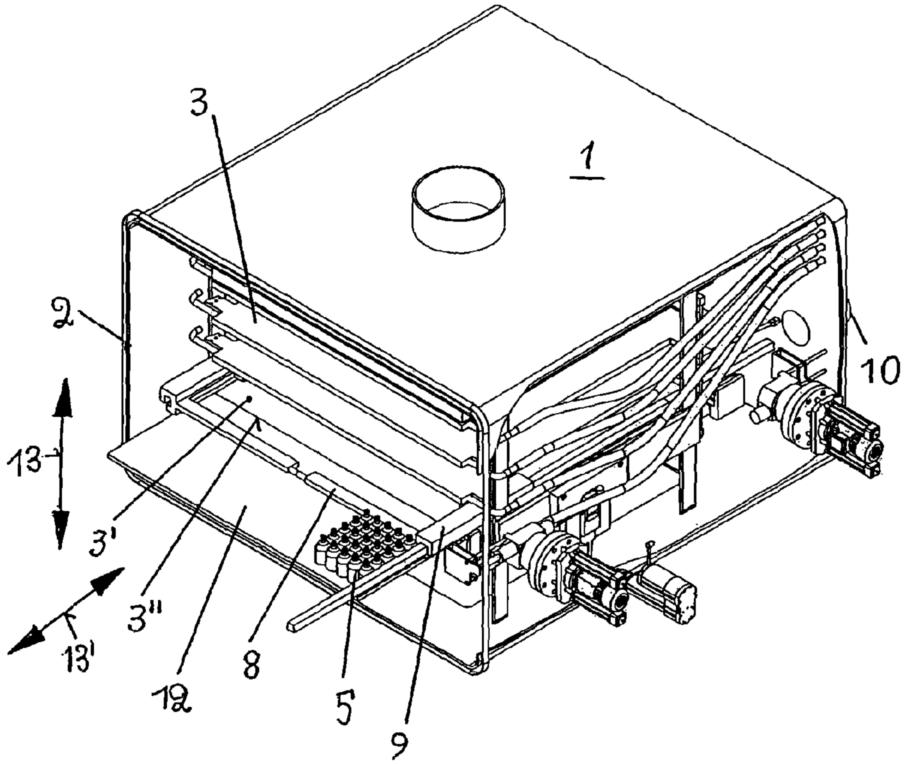

The carriage 8 is subsequently moved in the direction of the front side 2 by actuation of the two linear motors so that finally, as shown in FIG. 5, the drying vessels 5 can be displaced on the standing surface 3' beyond its front edge 3" onto the bridge part 12.

Figure 3:
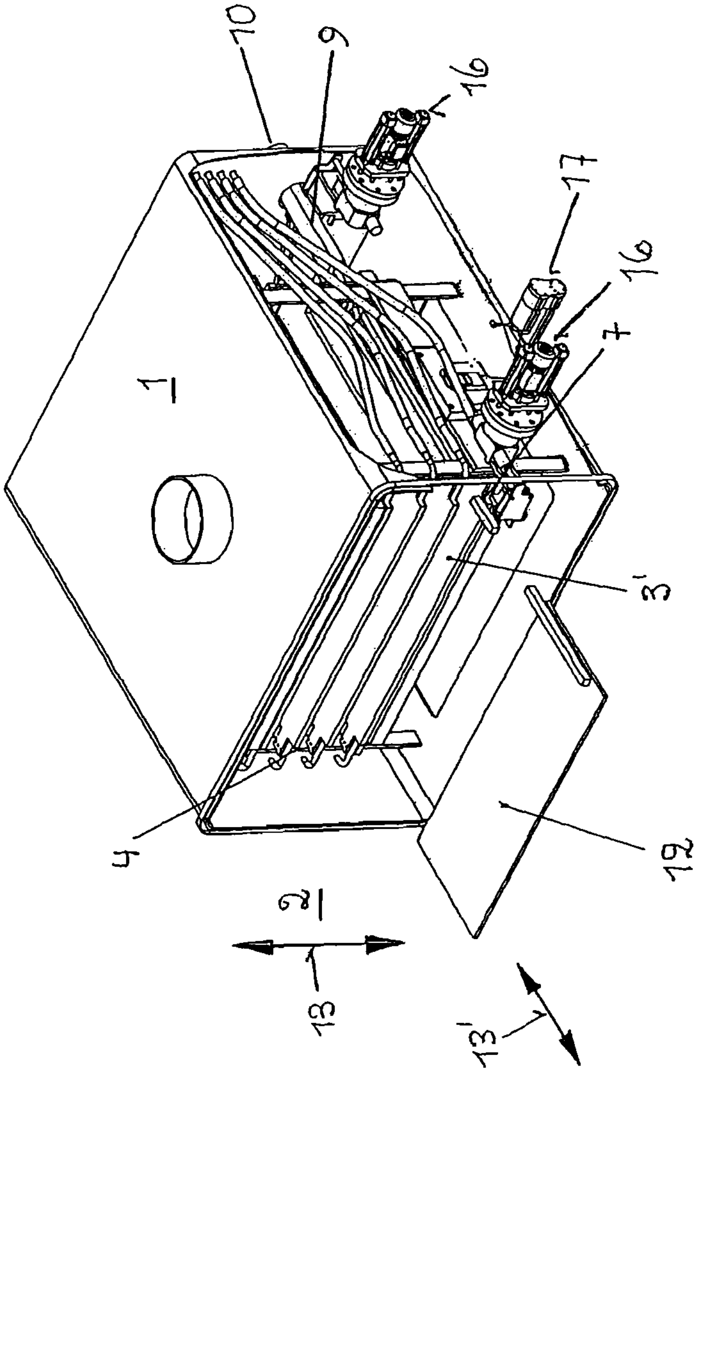
FIG. 3 illustrates a perspective view of the drying chamber in accordance with FIG. 1 at the beginning of an unloading process.

The bridge part 12 is then returned to its inoperative position shown in FIG. 3.

An essential prerequisite for the manner of operation presented above is that the guides 7 on the two sides are dimensioned in such a way that the carriage 8, as shown in FIG. 5, can travel to a position on the bridge part 12. This can be achieved by a formation of the guide 7 or at least of segments of the guide 7, which is displaceable in this direction. This can also be achieved by a construction at least of segments of the guide 7, which can telescope in this direction.

As an alternative thereto the bridge part 12 can also be fitted with guides which supplement the effect of the guides 7 and can be a component of the conveyor devices being followed.

As shown in particular by FIG. 5, the primary part of each one of the two linear motors consists of a hollow structure which engages around the correspondingly formed guide 7 on the outside and in this ways imparts a guide function. Incorporated into this hollow structure are the electromagnetically active parts of the primary part which lie directly opposite the magnetically active parts of the secondary part of the guide 7, in particular in such a way that an advancing function is achieved.

The drives 16 and 17 are, amongst other things, intended to cause the guides 7 to effect a shaking movement during the insertion and extraction of drying vessels 5. This feature serves to improve the displaceability of the drying vessels, in particular on large standing surfaces, in that the standing stability on the standing surface during a displacement process is increased.

The said holders which are allocated to respective edge regions of the standing surface 3' and are connected to the drives 16 can all be moved into a position engaging below the standing surface 3' so that the standing surface 3' is held at a defined height. These movements of the holders can therefore be effected with the guides 7. This is particularly advantageous since in this way a precise adjustment of the vertical spacing between this standing surface to be unloaded and the standing surface located immediately thereabove is made possible. Consideration of different sizes of the standing drying vessels is thus facilitated.

As soon as the drying vessels 5 have been fully transported away from the standing surface 3' via the unloading table 12, another standing surface 3 containing drying vessels 5 to be unloaded can be displaced to the unloading position, whereupon the above-described procedure is repeated.

The essential components of such an unloading device, in particular the carriage 8, can be removed from the drying chamber 1 for cleaning and/or sterilization purposes, possibly after disconnection of the electrical supply, and can be reinserted therein in an extremely simple manner.

These components are also completely housed within the drying chamber 1, in particular in such a way that—apart from an unloading process—there is no engagement into the space above and/or below the standing surfaces 3.

No lateral guide strips fixedly connected to the standing surfaces are required for the standing surfaces 3 because the application of a lateral guide effect is required only during an unloading process or during a loading process. However, this is achieved by the two lateral guides 7 which simultaneously receive the carriage 8 via the primary parts 9. This means that entirely smooth standing surfaces 3 which are easy to handle in terms of asepsis can be used.

The concept of an unloading device consisting of a carriage 8 which can move in parallel with the lateral edges of a standing surface 3 located in the unloading position and which is supported on lateral guides 7 is described above, which guides at the same time apply a guiding function to the drying vessels 5 as they are being pushed over onto a bridge part 12.

In an essentially fully comparable manner, i.e. using these components, a loading process can also be carried out. In this case there are a variety of possibilities for bringing a group of drying vessels standing on a bridge part into the working region of a carriage pushing this group and supported on lateral guides, which guides at the same time apply a lateral guide function to the group.

In particular, in order to stabilize the standing position of the drying vessels, these can be disposed between two carriages lying on the lateral guides as they are being pushed over onto the standing plate of the drying chamber, wherein the first carriage in the advancing direction effects a counter-holding function. Conversely a counter-holding function of this type can also be produced by a second carriage during an unloading process, so that, without any risk of the drying vessels tipping over, an automated loading and unloading operation of the freeze drying installation can be produced based on short cycle times.

An essential feature of the above-described freeze drying installation is that both loading and unloading processes are carried out via the front side 2 thereof so that the drying vessels are loaded and unloaded in opposing displacement directions. However, a “pass-through operation” in which loading and unloading processes take place in the same displacement directions via mutually opposite doors in the wall of the drying chamber 1 is equally achievable.

It will be recognized that the proposed concept of an automated loading and unloading device is applied in a simple and clear manner in terms of its mechanical operation, is maintenance-friendly and does not conflict with the remaining operation of the freeze drying installation.

In the exemplified embodiment illustrated in FIGS. 1 to 5, the drying vessels 5 are supported directly on the standing surfaces 3, 3'.

Figure 6:
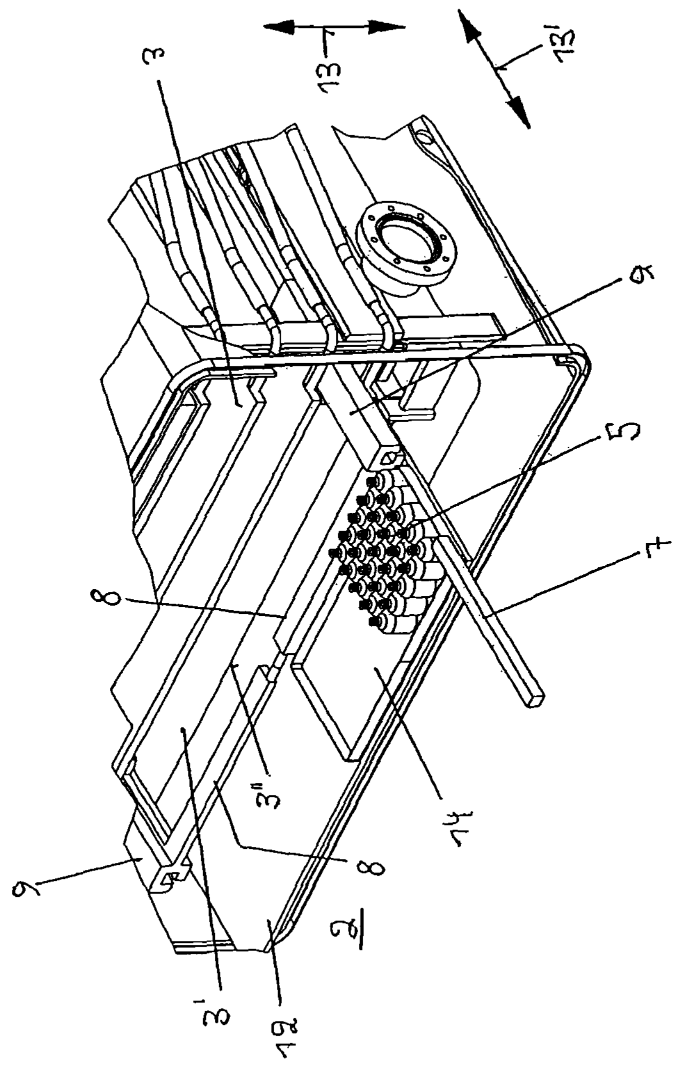
FIG. 6 illustrates a variation of an unloading device in accordance with the invention.
Figure 7:
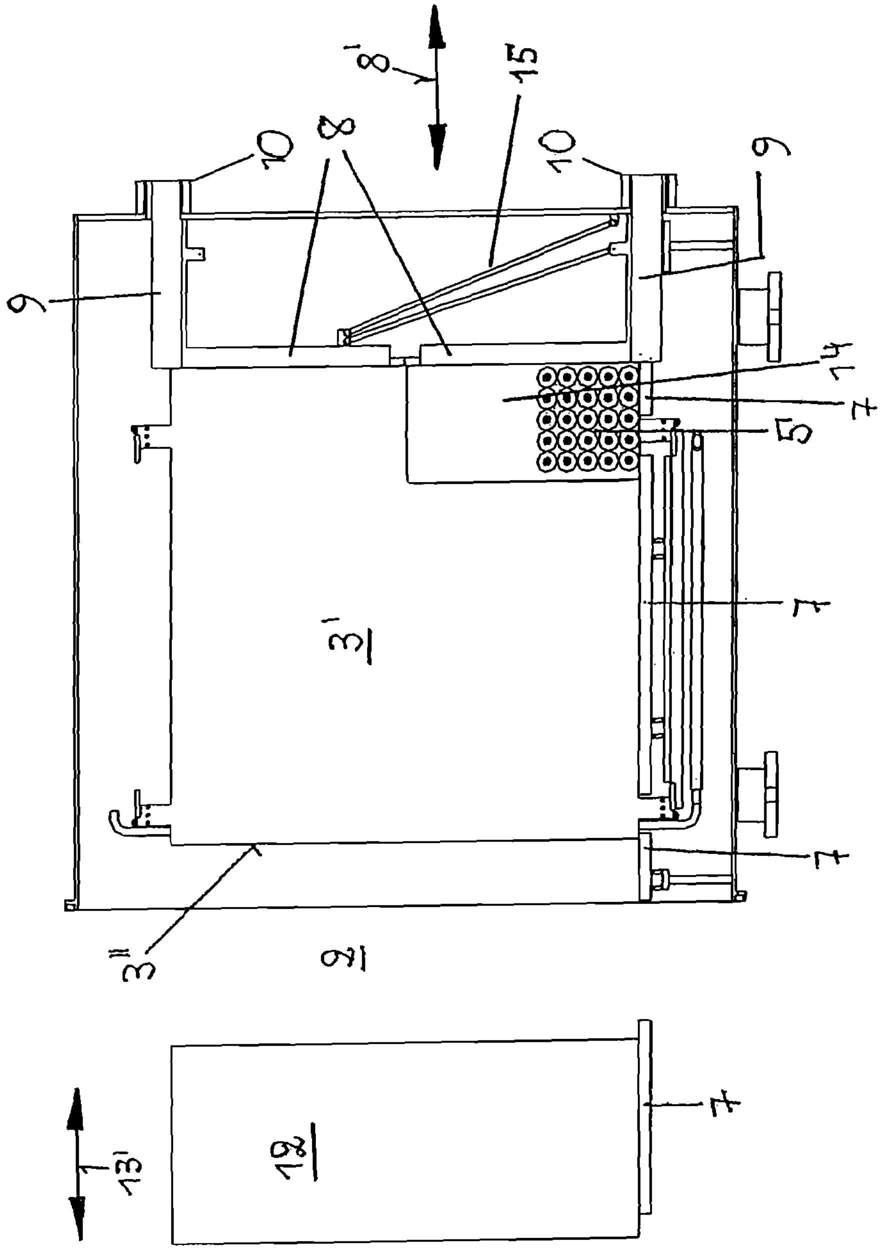
FIGS. 7, 8 respectively illustrate a plan view of successive phases of the unloading device in accordance with FIG. 6 during an unloading process.
Figure 8:
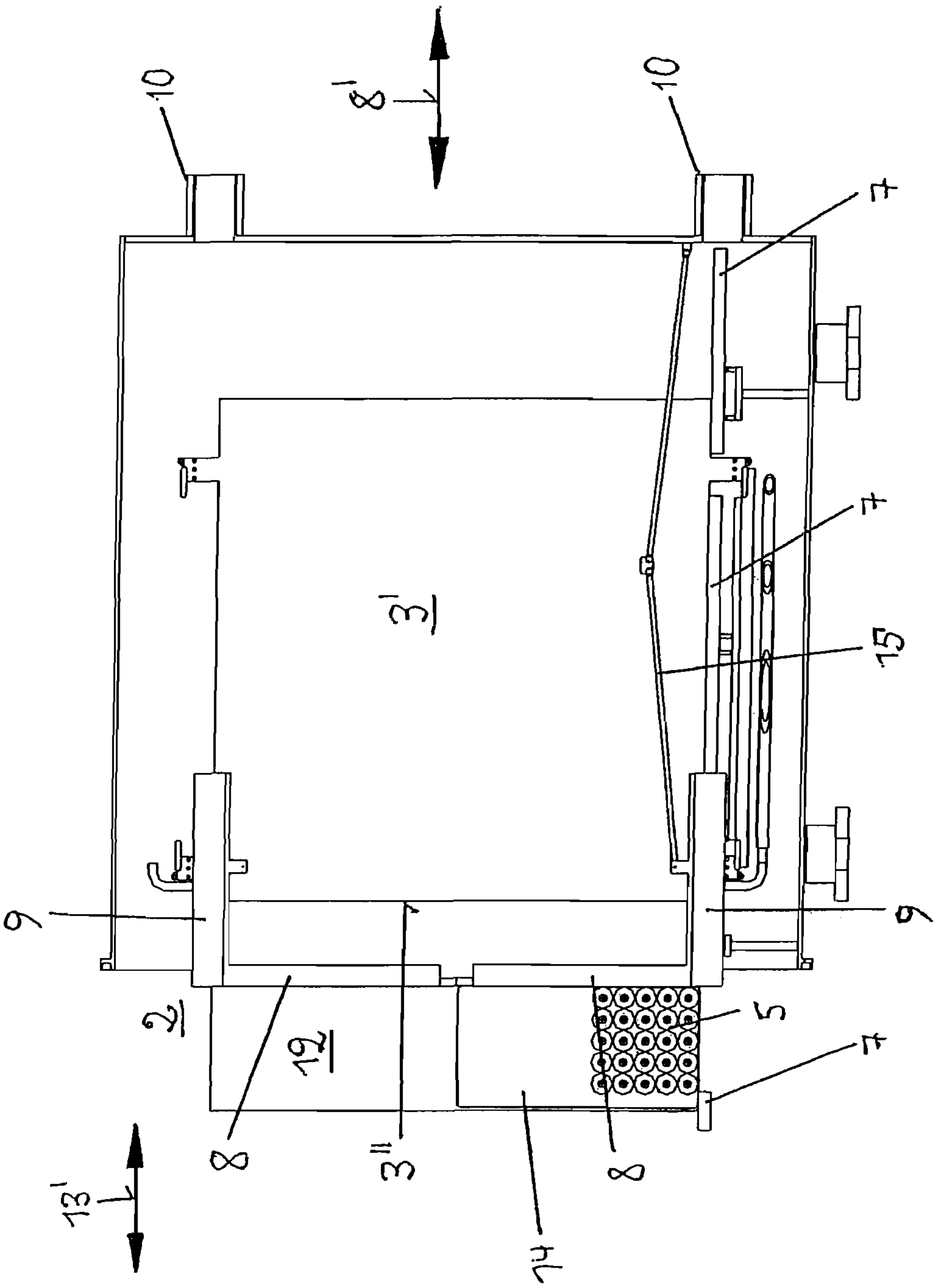
Figure 9:
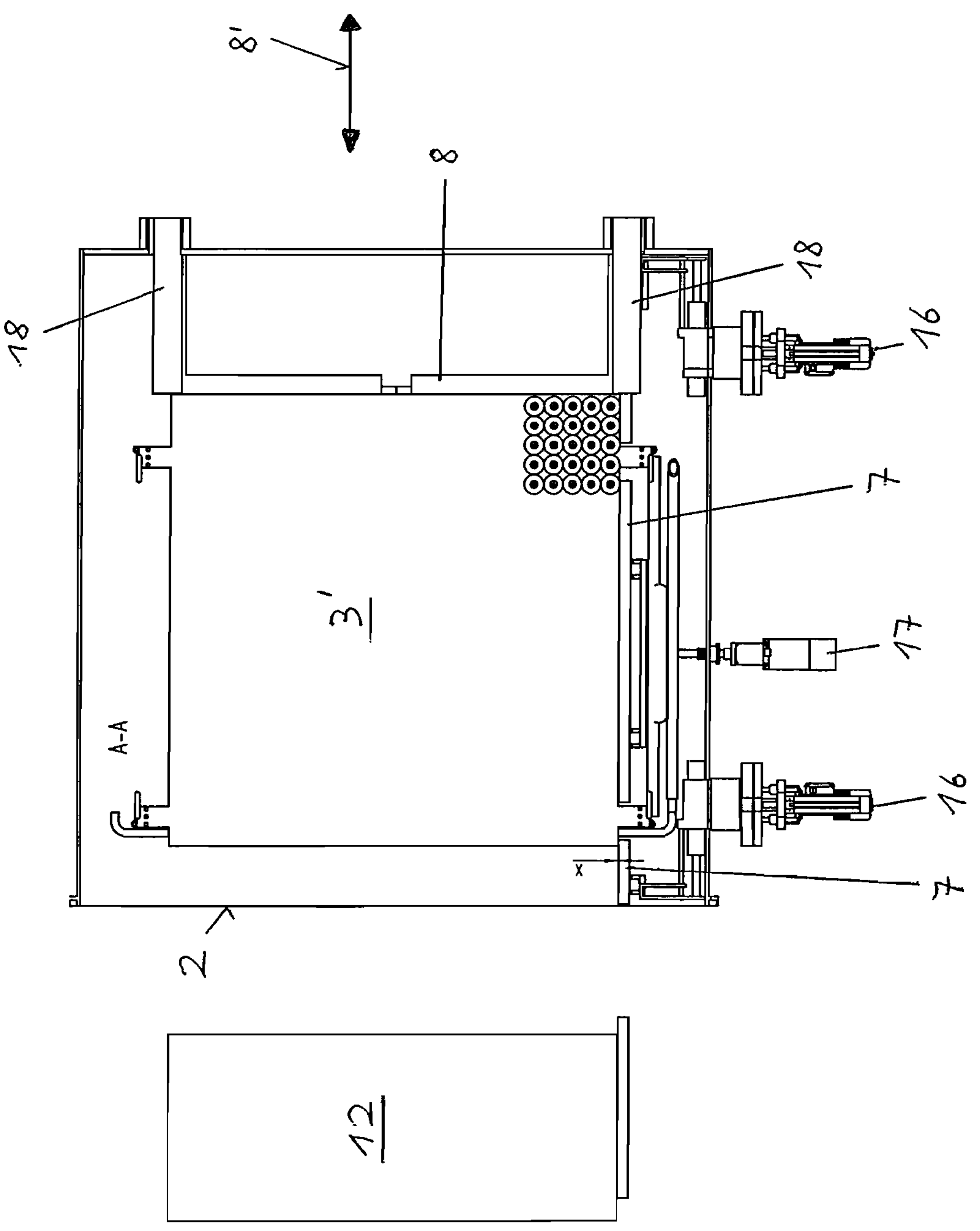
FIGS. 9 to 12 illustrate a drying chamber of a freeze drying installation with an unloading device in accordance with the invention with an alternative linear drive, wherein the figures correspond to FIGS. 2 to 5 in a corresponding sequence.
Figure 10:
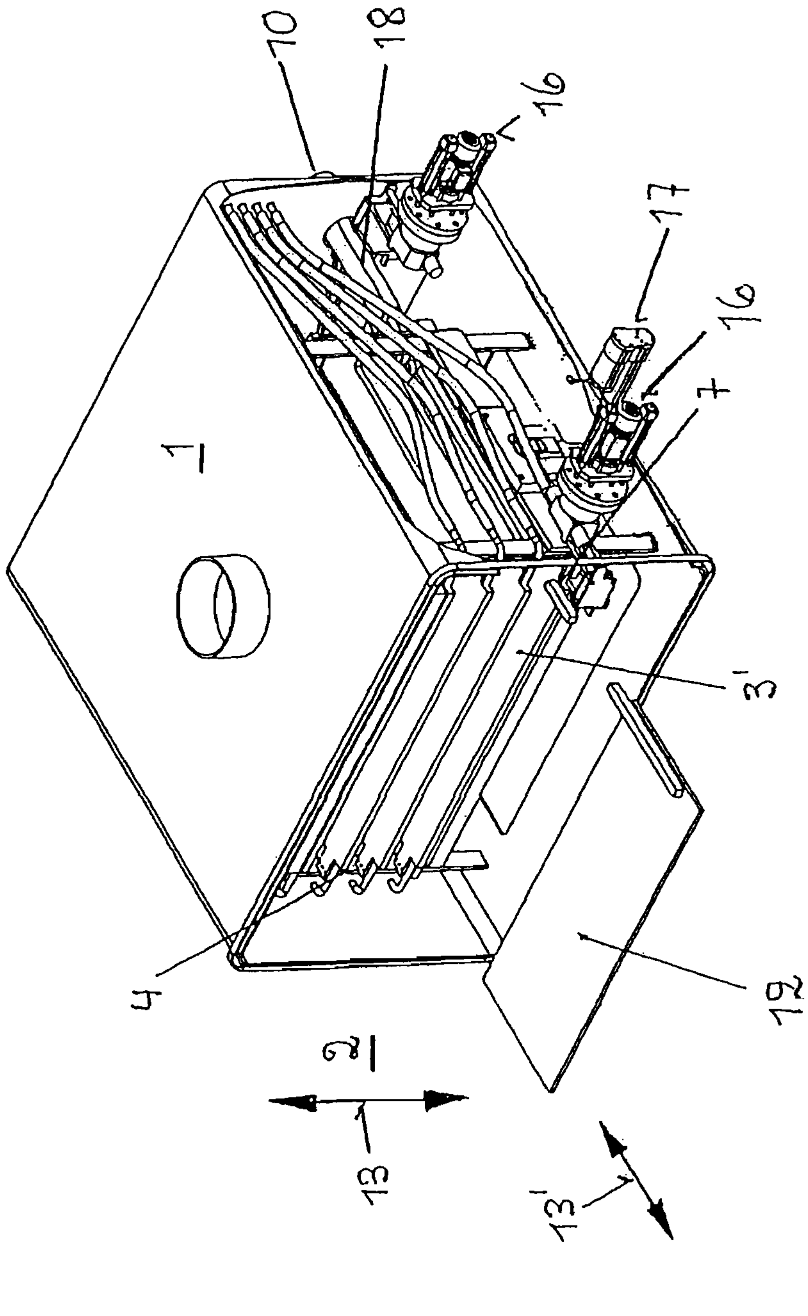
Figure 11:
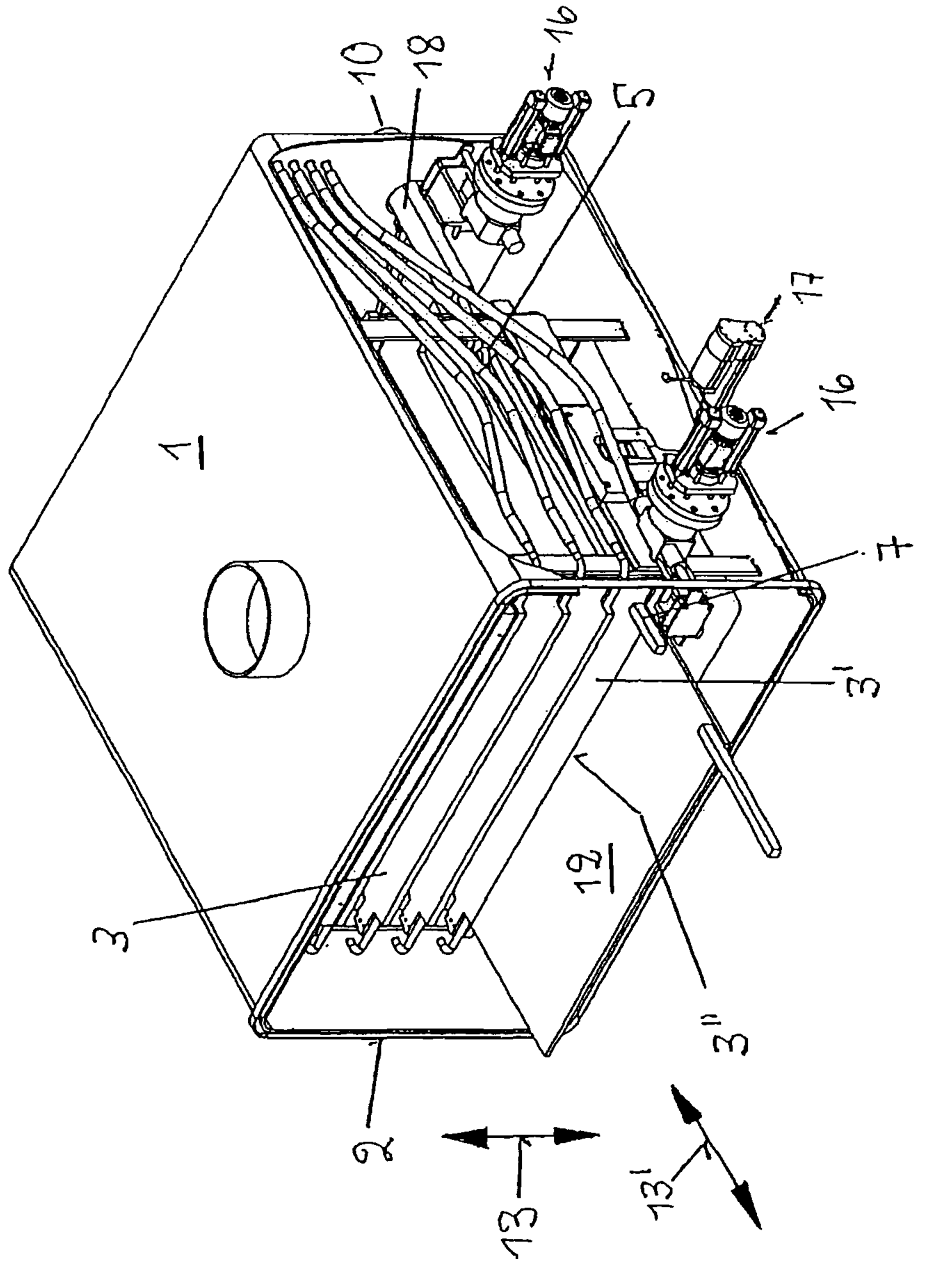

In FIGS. 6 to 8 the same functional elements are again designated in the same manner, wherein the drives are not illustrated since these are not required at least for displacement of the guides in the longitudinal direction thereof. The drying vessels 5 stand in groups in rectangular trays 14 on the standing surfaces 3, 3', wherein these trays 14 permit uniform handling of a respective group of drying vessels 5 during both loading and unloading. Instead of the trays 14, rectangular frames can also be used for example.

In the case of this variation, a displacement of the segments of the guide 7 is not required, so that they are fixedly connected to the drying chamber. The carriage with the primary parts is thus able to travel over gaps between these segments.

FIG. 7 shows the beginning of an unloading process, wherein a tray 14 lies with one long side against the guiding edge of the carriage 8, a frame may also be used, which tray/frame is displaced by actuation of the carriage in the movement direction 8' thereof onto the front side 2 of the drying chamber. A bridge part 12 is moved in the direction of the arrows 13' onto the front side 2 of the drying chamber 1 and to the position shown in FIGS. 6 and 8 and characterized by the bridge part 12 lying against the edge 3" of the standing surface 3', from which position the tray 14 or frame can be moved from the standing surface 3' onto the bridge part 12.

During the whole movement the tray 14 is guided laterally by the guides 7 and perpendicular thereto in the direction of the bridge part 12 by the carriage 8. The guides 7 respectively form fixed guiding edges and the carriage 8 forms a moveable guiding edge.

The variation illustrated in FIGS. 6 to 8 of a loading and unloading device otherwise corresponds to the embodiment already depicted in FIGS. 1 to 5 so that there is no need to repeat the description thereof.

The drying chamber as shown in FIGS. 9 to 12 has a vertical cross-sectional image corresponding to FIG. 1, which does not differ from that in FIG. 1. As in the case of the unloading device in accordance with the invention as shown in FIGS. 1 to 5, in the unloading device in accordance with FIGS. 9 to 12, in which the same functional elements are designated in a corresponding manner, in particular in comparison with FIGS. 1 to 5, the drive of the carriage is formed as a linear drive but with the difference that it consists of two linear motors, each of which consists of a primary part, constructionally integrated into a guide 7, and of a secondary part which is designated by 18, supports the carriage 8 in a directly lateral manner, is elongate, contains an arrangement of permanent magnets of polarities which alternate in the longitudinal direction and is slidably supported on the respective guide 7. In the parking position, the secondary parts 18 can be partially received in pipe connections 10 of the wall of the drying chamber 1, which can otherwise be formed as windows. The length measurement of the segments of the guide 7 is arranged to allow accommodation of the electromagnetically active portions of the primary part which are positioned magnetically perpendicular to the movement direction 8' of the carriage 8.

The two linear motors can be supplied with power e.g. via a line received in a flexible vacuum-tight stainless steel corrugated hose (not shown), which line is connected to the two primary parts of the two guides 7 and which is connected to an external control (not shown) via a vacuum-tight wall duct of the drying chamber 1 receiving the said hose. Since the two linear motors consist of a plurality of moveable segments, these are connected to each other also by means of a stainless steel corrugated hose (not shown). By means of this line or group of lines it is possible at the same time for control signals and signals describing the position of the carriage to be transmitted.

Figure 12:
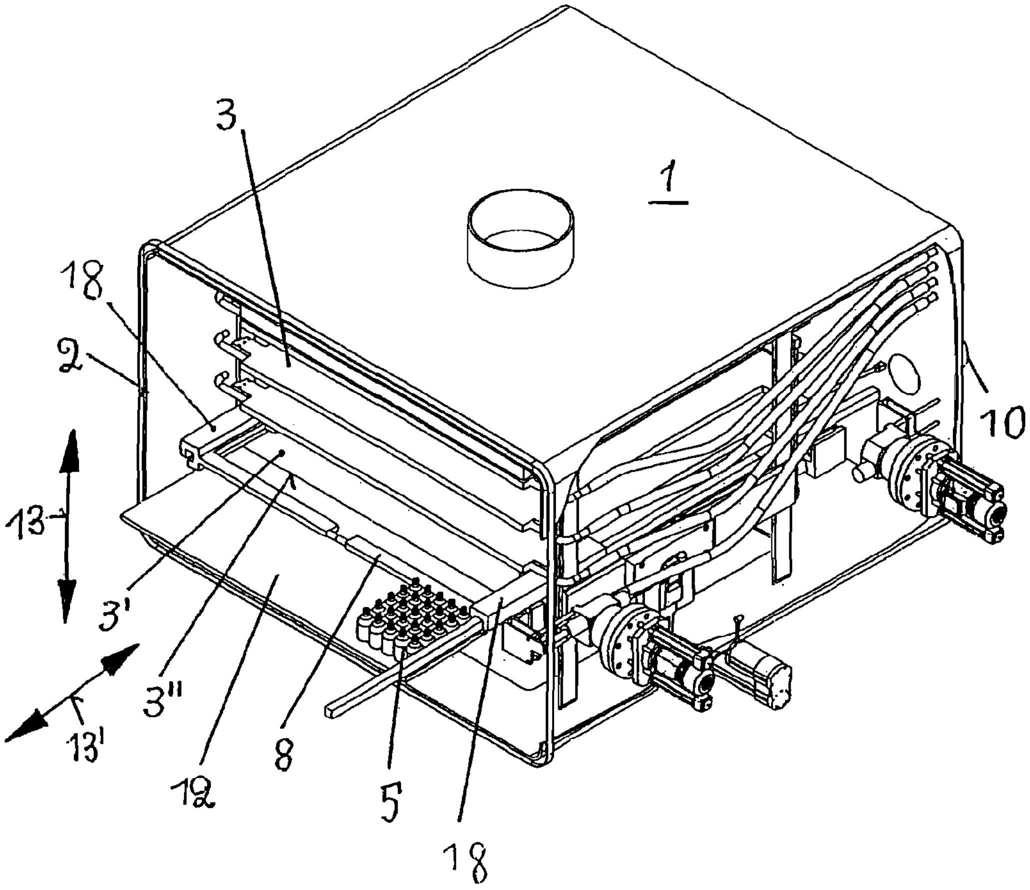

As shown in particular by FIG. 12, the secondary part 18 of each of the two linear motors consists of a hollow structure, which engages around the correspondingly formed guide 7 on the outside and in this way imparts a guide function. The permanent magnets of the secondary part are incorporated into this hollow structure and lie directly opposite the magnetically active parts of the primary part of the guide 7, in particular in such a way that an advancing function is achieved.

This embodiment also requires no lateral guide strips fixedly connected to the standing surfaces 3 for these standing surfaces because the application of a lateral guiding effect is required only during an unloading process or during a loading process. However, this is achieved by the two lateral guides 7 which simultaneously support the carriage 8 via the secondary parts 18. This means that completely smooth standing surfaces 3 can be used which are easy to handle in terms of asepsis.

Otherwise, the drying chamber in accordance with FIGS. 9 to 12 corresponds to that in accordance with FIGS. 1 to 5.

Figure 13:
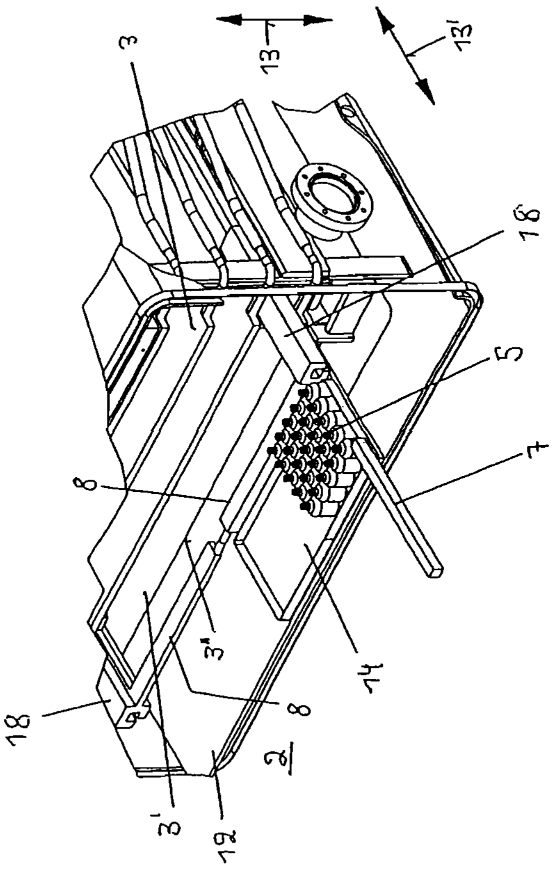
FIGS. 13 to 15 illustrate a variation of an unloading device in accordance with the invention with an alternative linear drive, wherein the figures correspond to FIGS. 6 to 8 in a corresponding sequence.
Figure 14:
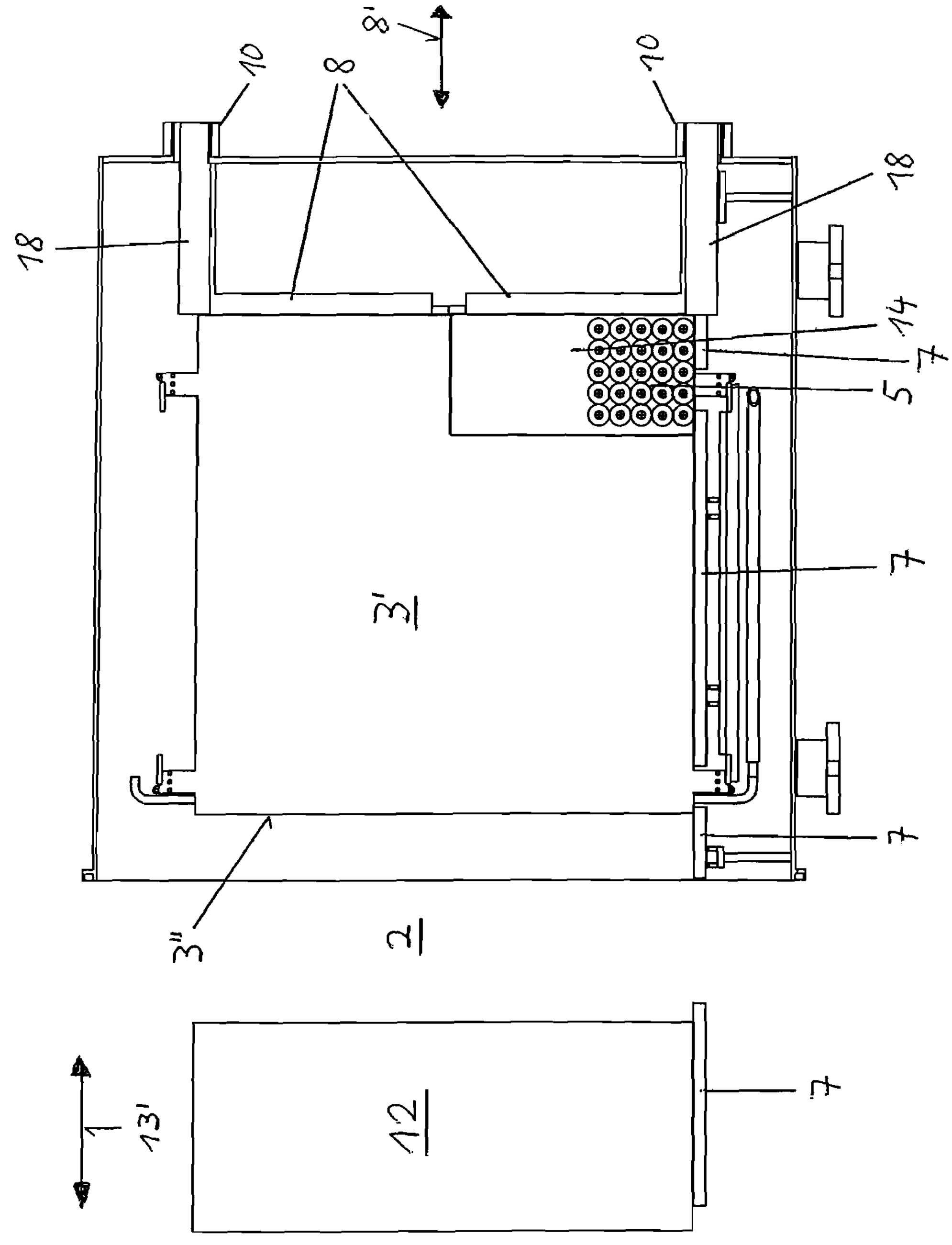
Figure 15:
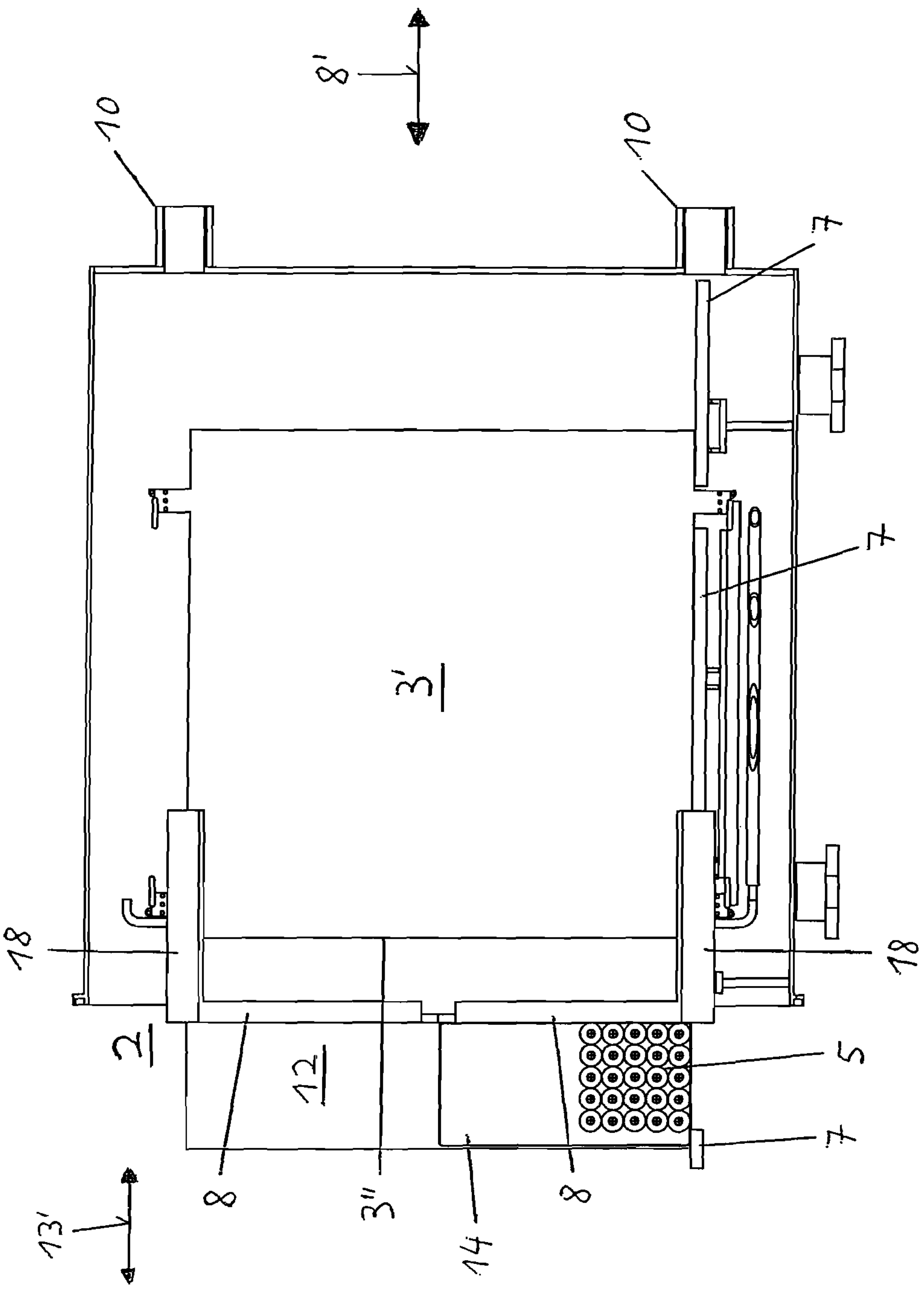

In the case of the unloading device in accordance with FIGS. 13 to 15, the same functional elements are again designated in a corresponding manner, in particular in relation of FIGS. 6 to 8. The unloading device in accordance with FIGS. 13 to 15 corresponds to that of FIGS. 6 to 8, again with the difference that the drive of the carriage, which is formed as a linear drive, consists of two linear motors, each of which consists of a primary part constructionally integrated into a guide 7 and of a secondary part which is designated by 18, supports the carriage 8 in a directly lateral manner, is elongate, contains an arrangement of permanent magnets of polarities which alternate in the longitudinal direction and is slidably supported on the respective guide 7. Otherwise, this unloading device in accordance with FIGS. 13 to 15 corresponds to the unloading device in accordance with FIGS. 6 to 8.

The variation in accordance with FIGS. 13 to 15 also does not require a displacement of the segments 7 of the guide, so that they are fixedly connected to the drying chamber. The carriage with the secondary parts 18 is thus able to travel over gaps between these segments.

The concept of such devices in accordance with the invention is particularly suitable for permitting modular retrofitting of existing devices with the aim of achieving an automated loading and unloading process, in that guides which are independent of the standing surface and form lateral guiding edges are incorporated one after another and can be displaced laterally with a view to an adaptation to the different diameters of the drying vessels which serve as a support for a carriage etc.

REFERENCE LIST

1 drying chamber
2 front side
3 standing surface
3' standing surface
3" edge
4 frame
5 drying vessel
6 unloading position
7 guide
8 carriage
8' movement direction
9 primary part
10 pipe connection
12 bridge part
13 movement direction
13' movement direction
14 tray/frame
15 stainless steel corrugated hose
16 drive
17 drive
18 secondary part

The invention claimed is:

1. A device for pushing drying vessels, which contain a material to be dried and stand on one of the plurality of standing surfaces of the drying chamber of a freeze drying installation, in a movement direction for the purpose of unloading or loading the standing surface through at least one opening in the wall of the drying chamber, the device comprising:

- a carriage which forms a guiding edge, moveable in the movement direction, and is configured to exert an advancing effect on the drying vessels, which carriage is displaceably supported on guides which are disposed inside the drying chamber on both sides at a distance from the standing surface to be loaded or unloaded, which are in parallel with each other and with the movement direction and which form fixed guiding edges,
- wherein the guides consist of a plurality of segments disposed one behind the other and disposed so as to be displaceable in a common longitudinal direction,
- wherein a height position of the guides is fixed inside the drying chamber,
- wherein the guides are disposed so as to be displaceable while maintaining their mutually parallel alignment perpendicular to the edges of the standing surface allocated thereto and in parallel with the plane thereof; and
- at least one linear motor configured to produce a drive for the carriage and which imparts a non-positive connection to at least one of the guides, wherein a primary part of the linear motor, supported on the guide, is connected to the carriage and a secondary part of the linear motor is constructionally integrated into the guide.

2. A device for pushing drying vessels, which contain a material to be dried and stand on one of the plurality of standing surfaces of the drying chamber of a freeze drying installation, in a movement direction for the purpose of unloading or loading the standing surface through at least one opening in the wall of the drying chamber, the device comprising:

- a carriage which forms a guiding edge, moveable in the movement direction, and is configured to exert an advancing effect on the drying vessels, which carriage is displaceably supported on guides which are disposed inside the drying chamber on both sides at a distance from the standing surface to be loaded or unloaded, which are in parallel with each other and with the movement direction and form fixed guiding edges,
- a fixed spacing sensor which is not connected to the secondary part and which is arranged to detect the position of the secondary part,
- wherein the guides have two different primary parts which are disposed one above the other or one next to the other so that by means of a second secondary part which is disposed in a correspondingly offset manner with respect to the first, a second carriage can be moved independently of the carriage, and
- at least one linear motor configured to produce a drive for the carriage and which imparts a non-positive connection to at least one of the guides, wherein a primary part of the linear motor is constructionally integrated into the guide and a secondary part of the linear motor, supported on the guide, is connected to the carriage.

3. The device as claimed in claim 1, wherein the carriage can travel inside the drying chamber on the guides to an inactive position outside the standing surface.

4. The device as claimed in claim 1, wherein two carriages are supported on the guides, which, during a loading or unloading movement, as seen in the displacement direction, are each configured for front-side contact fulfilling a counter-holding function on the drying vessels and for rear-side contact fulfilling an advancing function on the drying vessels.

5. The device as claimed in claim 1 further comprising a bridge part which is disposed outside the drying chamber so as to be displaceable at least vertically or perpendicularly to the planes of the standing surfaces.

6. The device as claimed in claim 5, wherein in an unloading position the bridge part and the standing surface to be unloaded are positioned in a common plane lying against each other via the opening in the wall of the drying chamber, and the guides or at least segments thereof are disposed so as to be displaceable in their longitudinal direction such that by means of the carriage an advancing function into the region of the bridge part can be applied.

7. The device as claimed in claim 5, wherein the bridge part can additionally be used for loading purposes.

8. The device as claimed in claim 1, further comprising a bridge part which is configured for loading purposes and is disposed outside the drying chamber so as to be displaceable at least vertically or perpendicularly with respect to the planes of the standing surfaces.

9. The device as claimed in claim 8, wherein in a loading position the bridge part and the standing surface to be loaded are positioned in a common plane lying against each other via the opening in the wall of the drying chamber, and the guides or at least segments thereof are disposed so as to be displaceable in their longitudinal direction such that at least by means of a carriage an advancing function can be applied to the drying vessels, standing on the bridge part, as far as the standing surface.

10. The device as claimed in claim 1, further comprising means configured to cause the guides to effect a shaking movement during insertion or extraction of drying vessels.

11. The device as claimed in claim 1, wherein the standing surfaces are held in a plate frame permitting vertical displacement thereof within the drying chamber, and at least one system of supports is provided which can be displaced in parallel and which are configured for engagement below a standing surface located at a defined height position, and the plate frame and the system of supports are configured and disposed such that by means of the system of supports a height position, which is independent of the plate frame, of the standing surface which is engaged from beneath can be produced.

12. The device as claimed in claim 11, wherein the system of supports is allocated to the loading and/or unloading position of the standing surfaces.

13. The device as claimed in claim 2, wherein the spacing sensor is a laser-optical sensor which is attached outside the drying chamber to a pipe connection, which partially receives the secondary parts, of the drying chamber wall.

14. The device as claimed in claim 2, wherein the guides consist of a plurality of segments disposed one behind the other, wherein individual segments can be switched to become inactive so that the carriage can move on active segments and a second carriage rests on inactive segments.

* * * * *